Patented Sept. 19, 1950

2,523,228

UNITED STATES PATENT OFFICE 2,523,228

PLANT GROWTH CONTROL MATERIALS

Wendell R. Mullison, Midland, Mich., assignor to The Dow Chemical Company, Midland, Mich., a corporation of Delaware No Drawing. Application May 22, 1948, Serial No. 28,732

4 Claims. (Cl. 71—2.6)

This invention relates to plant growth control materials and is particularly directed to compositions and methods for the selective control of weeds and for the killing of plants generally.

It has been discovered that the butoxy-propyl and butoxy-propoxy-propyl esters of 2,4-dichlorophenoxy-acetic acid may be used for controlling the growth of vegetation and killing of weeds. Also, they may be utilized for the selective control of broad leaf weeds in narrow leaf plant crops. The compounds are of low volatility, whereby compositions in which they are employed are adapted to produce a control of weeds with a minimum of danger to adjacent or co-existing desirable vegetation.

When operating in accordance with the present invention, the toxicants are compounded with carriers to form spray or dust compositions.

Spray compositions may be employed for both selective and non-selective control of vegetation. In such compositions, from about 0.01 to 1.0 per cent by weight or more of the toxicant is dispersed in water or other suitable carrier. The exact proportion of the toxicant is largely determined by the susceptibility of the plants to be controlled, the amount of spray to be applied per acre, the presence or absence in the mixture of other additaments, such as wetting and emulsifying agents, the proximity of desirable plants, and the end result desired.

In preparations for non-selective control, the toxicant may be dispersed in water or associated with an oil, e. g. vegetable, animal, petroleum, or synthetic oils, such as castor oil, sperm oil, soy bean oil, liquid olefins, halohydrocarbons, and lubricating oil, and the resulting composition applied directly to plant surfaces or dispersed in water to form an emulsion. Generally from about 50 gallons to 400 gallons of a spray is applied per acre to distribute a minimum of 0.25 pound of toxicant per acre.

In selective control, the volume of spray material employed is preferably maintained at a minimum with from about 0.25 to 2 pounds of the toxicant dispersed in from 5 to 200 gallons of water being applied per acre. From 25 to 50 gallons of spray per acre will give good results and as little as 5 to 20 gallons per acre is frequently operable. For the selective control of annual weeds in small grains, the application of from 0.25 to 1.0 pound of the toxicant per acre is desirable.

It should be understood that the selective control of weeds does not always require their complete destruction. Thus the desired result is obtained by controlling the growth of the noxious vegetation thru stunting, severe injury, or retardation, whereby the selective growth of the crop is encouraged. Once established, the crop can compete successfully with the retarded weed growth which is eventually choked out of the mixed stand.

A convenient method of producing sprays includes the initial production of a concentrate. Such composition contains the toxicant in mixture with a suitable wetting and emulsifying agent, and is readily dispersible in inert liquid carriers to form sprays containing the toxicant in any desired amount. The toxicant may constitute from 5 to 95 per cent by weight of the concentrate. The choice of wetting and emulsifying agent and the amount thereof employed are determined by the ability of the agent to facilitate the dispersion of the concentrate in water to produce desired spray compositions. Suitable wetting and emulsifying agents for use in concentrates or otherwise are sodium lauryl sulphate, glyceryl oleate, sulphonated aromatic hydrocarbons, blood albumin, sulphonated oils, metal caseinates, complex organic ester derivatives, sulphite pulping waste products, aromatic aliphatic ether alcohols, and the like. An alternative method of operation comprises dissolving the toxicant in a water-miscible organic solvent and adding such concentrate to the required amount of water or other liquid carrier.

In the preparation of dust mixtures, for both general and selective vegetation control, the toxicants are employed in somewhat higher concentration. Thus, the ester compounds may be compounded with any suitable finely divided solid carrier in the amount of 1–40 per cent by weight or higher of the ultimate composition. This may be accomplished by wetting and mixing the carrier with the toxicant, or with a solution of the toxicant in an organic solvent and thereafter evaporating the solvent. Solid carriers which may be so employed include pyrophyllite, talc, chalk, diatomaceous earth, volcanic ash, bentonite, wood flour and the like.

The method of application of the new compositions to plants for the purpose of accomplishing a non-selective control is not critical, provided that a substantially complete coverage of the plant surfaces be obtained at least a short time prior to heavy precipitation. The dusts or sprays may be applied to plant surfaces wet with either dew or rain. Maximum effectiveness of the toxicants is obtained when they are applied during warm weather (temperatures above 50° F.). The ester compounds have a cumulative effect upon plants, so that multiple applications of a composition of lower strength than recommended above, may destroy vegetation, although a single application might not be particularly phytotoxic.

The application of the compounds for selective control of plant growth is somewhat more critical. The spraying or dusting is best carried out through the middle of a warm day when the plant surfaces are free of moisture, and complete coverage of all plant surfaces is not essential. A scattered distribution of the toxicant on the surfaces of the leaves of the weeds is generally sufficient to accomplish growth control with a minimum of danger to the crop. Discretion should be exercised in the inclusion of wetting agents in compositions for selective control, since the tolerance of many desirable crop plants is largely a function of the water repellency of the leaf surfaces.

The new compositions may be applied by conventional methods. One preferred method of operation consists of applying sprays under pressure by means of a boom attached to a mobile spray outfit, the boom connecting directly to the spray tank and being equipped with downwardly directed nozzles distributed at intervals along its length. Such equipment permits the treatment of a considerable swath of grain or other field crop with a minimum of drift and of mechanical injury to the crop. A desirable technic for large scale operation comprises applying dusts or low volume sprays from an aeroplane. This is particularly advantageous in the treatment of extensive stands of grain where the possibility of injury to other crops from airborne residues and drift is at a minimum.

The ester compounds employed in accordance with this invention are oily liquids, somewhat soluble in many organic solvents and relatively insoluble in water. They are stable to light and air, not appreciably affected by carbon dioxide, non-corrosive to the skin of man and higher animals, and of low volatility. The compounds may be represented by the formula:

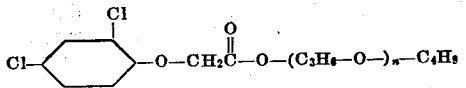

wherein $n$ is an integer not greater than 2. One method for preparing the compounds consists of reacting substantially equimolecular proportions of butoxy-propanol or butoxy-propoxy-propanol with 2,4-dichloro-phenoxy-acetic acid in the presence of a dehydration catalyst such as sulphuric acid. In such preparation, the reactants are mixed together and heated for one hour or longer at a temperature of 50°–75° C. Better yields are obtained when an excess of the ether-alcohol is employed, and water of reaction is removed as formed. Following completion of the reaction, the mixture is diluted with carbon tetrachloride or other suitable water immiscible solvent, and neutralized with an alkali, such as dilute aqueous sodium carbonate. The resulting mixture divides into aqueous and solvent layers. The solvent layer is separated from the aqueous and washed several times with water to remove the water soluble salts of catalyst and unreacted 2,4-dichlorophenoxy-acetic acid. The solvent is then removed by distillation under reduced pressure to obtain the desired ester.

In a copending application of Edgar C. Britton, et al., Serial No. 28,735, filed concurrently herewith, a detailed description is given of the preparation and properties of these compounds.

EXAMPLE 1

Concentrates having the following percentage composition by weight were prepared by mixing the constituent materials together at room temperature.

Concentrate A

| | Per cent |
|---|---|
| Butoxy-propyl ester of 2,4-dichlorophenoxy-acetic acid (refractive index (n/D of 1.566 at 60° C.) | 37.6 |
| (Tween 40) sorbitan monopalmitate polyoxyethylene derivative | 20.0 |
| Acetone | 42.4 |

Concentrate B

| | Per cent |
|---|---|
| Butoxy-propoxy-propyl ester of 2,4-dichlorophenoxy-acetic acid (refractive index (n/D of 1.497 at 60° C.) | 37.6 |
| (Tween 40) sorbitan monopalmitate polyoxyethylene derivative | 20.0 |
| Acetone | 42.4 |

These concentrates were free flowing liquids, somewhat oily in nature, and readily dispersible in water to produce herbicide sprays.

EXAMPLE 2

Two spray compositions were prepared, one from concentrate A and the other from concentrate B, by vigorously agitating sufficient quantities of the concentrates in water to obtain aqueous dispersions of the esters in amounts equivalent to 0.2 per cent by weight 2,4-dichlorophenoxy-acetic acid. The spray compositions were applied in mid-growing season at the rate of 75 gallons per acre for the selective control of broad leaf weed plants in two different lawn areas. The lawn areas selected for treatment were each 3 feet wide and 100 feet long and consisted of established turf in which Kentucky blue and red top were the principal grasses. Dandelions, plantain, buckhorn, bull thistle, and hop clover were scattered throughout the selected areas. Four days following the application of the herbicides, the grass appeared to be unaffected when compared with the grass in adjacent untreated control plots. The broad leaf weed plants in both treated areas showed definite hormone response as evidenced by the twisting and bending of their stems and foliage. Two months after the treatment, the grass in both treated areas was of a vigorous green color and in an active state of growth. In these plots, the broad leaf weed plants were severely affected, the majority being dead. Of those remaining, most were in an injured and dying condition. In the control plots, the weeds had flourished at the expense of the grass, the latter appearing brown and burned and with little indication of new growth.

EXAMPLE 3

Similarly, a spray was compounded from concentrate A in the form of an aqueous dispersion of butoxy-propyl 2,4-dichloro-phenoxy-acetate in amount equivalent to 0.1 per cent by weight of 2,4-dichlorophenoxy-acetic acid. This composition was applied in mid-season on two different plots in an oat field for the selective control of a heavy infestation of sow thistle. The applications were made at the rate of 150 gallons per acre. One week following the treatment, the sow thistles appeared to have been severely affected, while the oat plants showed no evidence of hormone response. The oats continued in an active state of growth throughout the growing season and produced a normal crop of grain. Two months following the treatment, all the sow thistles in both treated areas were dead.

EXAMPLE 4

Sprays were prepared for concentrates A and B as described in Example 2. These compositions contained the ester toxicants in amounts equivalent to 0.1 per cent by weight of 2,4-dichlorophenoxy-acetic acid. The sprays were applied for the control of Canada thistle at the rate of 150 gallons per acre. Three weeks following the treatment, all the thistles appeared to have been severely affected, with the majority either dead or in a dying condition.

EXAMPLE 5

In a similar fashion, aqueous dispersions were prepared for concentrates A and B containing the ester toxicants in amounts equivalent to 0.0025 per cent by weight of 2,4-dichlorophenoxy-acetic acid. The sprays were employed to wet the surfaces of young tomato plants about six inches tall. The plants were observed daily for responses attributable to the treatment. It was found that all of the tomato plants were stunted by the treatments described. Those treated with the spray composition containing the butoxy-propoxy-propyl-ester of 2,4-dichlorophenoxy-acetic acid, died in 18 days. The spray composition containing the butoxy-propyl-ester of 2,4-dichlorophenoxy-acetic acid required 50 days to accomplish killing of the plants.

EXAMPLE 6

The volatility of residues of the butoxy-propyl and of the butoxy-propoxy-propyl esters of 2,4-dichlorophenoxy-acetic acid was tested by exposing young tomato plants to the vapors arising from surfaces previously wet with the compounds. In these operations, young tomato plants and two inch petri dishes partially filled with the indicated compounds were placed side by side on glass plates and covered by glass jars. Each determination was confined to a single compound. After 16 hours of exposure, the plants were removed and observed for hormone response. The test plants exhibited no injury or nastic response attributable to the growth control materials.

EXAMPLE 7

55 parts by weight of fuller's earth is wet with 45 parts of the propoxy-propyl ester of 2,4-dichlorophenoxy-acetic acid dissolved in methylene chloride. This concentrate is evaporated to dryness, mixed with finely divided pyrophyllite, and hammermilled thru a $\frac{1}{16}$ inch screen to produce a herbicide dust containing the toxicant in proportion equivalent to 5 per cent by weight of 2,4-dichlorophenoxy-acetic acid. This composition is adapted to be employed for the control of wild carrot, wild lettuce, wild mustard, sow thistle, and bindweed.

EXAMPLE 8

The two spray compositions of Example 2 were applied to two different plots of bracken ferns at the rate of 1500 gallons per acre. Two weeks following the application, all the ferns in both plots were severely affected. The majority of the ferns were dead, and those remaining appeared to have been fatally injured.

The compounds claimed as herbicides herein are claimed as new compounds per se in the application of Edgar C. Britton et al. Serial No. 28,735 filed May 22, 1948.

I claim:

1. A composition for controlling the growth of vegetation which comprises a carrier and dispersed therein as an active toxic ingredient a member of the group consisting of the butoxy-propyl and butoxy-propoxy-propyl esters of 2,4-dichlorophenoxy-acetic acid.

2. A composition for controlling the growth of weeds which comprises a liquid carrier and dispersed therein as an active toxic ingredient a member of the group consisting of the butoxy-propyl and butoxy-propoxy-propyl esters of 2,4-dichlorophenoxy-acetic acid in the amount of from 0.01 to 1.0 per cent by weight of the composition.

3. A herbicide dust composition comprising a finely divided solid carrier and dispersed thereon as an active toxic ingredient a member of the group consisting of the butoxy-propyl and butoxy-propoxy-propyl esters of 2,4-dichlorophenoxy-acetic acid in the amount of from 1 to 40 per cent by weight of the dust.

4. A herbicide concentrate comprising a toxic ingredient in intimate mixture with a wetting and emulsifying agent, the agent being capable of facilitating the dispersion of the composition in water, and the active ingredient being a member of the group consisting of the butoxy-propyl and butoxy-propoxy-propyl esters of 2,4-dichloro-phenoxy-acetic acid in the amount of from 5 to 95 per cent by weight of the concentrate.

WENDELL R. MULLISON.

REFERENCES CITED

The following references are of record in the file of this patent:

UNITED STATES PATENTS

| Number | Name | Date |
| --- | --- | --- |
| 2,390,941 | Jones | Dec. 11, 1945 |
| 2,396,513 | Jones | Mar. 12, 1946 |

OTHER REFERENCES

Chemical Abstracts, vol. 41, June 20, 1947. Columns 3902 to 3912 (Abstracting Botan. Gaz. 107, 476–507 (1946)).